(12) United States Patent
Kim et al.

(10) Patent No.: US 6,467,367 B2
(45) Date of Patent: Oct. 22, 2002

(54) POSITION SETTING DEVICE FOR A STEERING COLUMN OF A VEHICLE

(75) Inventors: Dong-Geun Kim, Kangwon-do (KR); Woo-Seop Shin, Kangwon-do (KR)

(73) Assignee: Mando Corporation, Pyungteak (KR)

( * ) Notice: Subject to any disclaimer, the term of this patent is extended or adjusted under 35 U.S.C. 154(b) by 0 days.

(21) Appl. No.: 09/734,431

(22) Filed: Dec. 11, 2000

(65) Prior Publication Data
US 2002/0066334 A1 Jun. 6, 2002

(30) Foreign Application Priority Data
Dec. 1, 2000 (KR) .......................................... 00-72269

(51) Int. Cl.[7] .............................................. B62D 1/18
(52) U.S. Cl. ........................................ 74/493; 280/775
(58) Field of Search ..................... 74/493, 527; 188/67; 280/775; 403/109.5

(56) References Cited

U.S. PATENT DOCUMENTS

| | | | | |
|---|---|---|---|---|
| 3,491,614 A | * | 1/1970 | Saunders et al. | ........... 403/325 |
| 3,570,322 A | * | 3/1971 | Krouse | ........................ 74/493 |
| 4,563,912 A | * | 1/1986 | Parks | ........................ 403/351 |
| 4,709,592 A | * | 12/1987 | Andersson | .................... 74/493 |
| 5,492,430 A | * | 2/1996 | Jones | ........................ 248/188.5 |

FOREIGN PATENT DOCUMENTS

DE   3409988 A1   *   9/1985

* cited by examiner

Primary Examiner—David Fenstermacher
(74) Attorney, Agent, or Firm—R. Neil Sudol; Henry D. Coleman; William J. Sapone (57) ABSTRACT

A position setting device for a steering column of an automotive vehicle comprises a steering column having telescoping internal and external pipes. A bendable steering shaft is disposed inside the steering column, a tilt device being provided to support the steering column according to the bending state of the steering shaft. A position control lever controls the tilt device by rotation. A wire cable has a wire which is connected to the position control lever is connected to a tapered block having guide protrusions inserted into grooves in a fixed upper block and a movable lower block for shifting the lower block out of a locking engagement with the inner pipe of the steering column, thereby enabling adjustment of the length of the steering column simultaneously with an adjustment in the angle of inclination of the steering column shaft.

2 Claims, 7 Drawing Sheets fig. 1  PRIOR ART fig. 2

PRIOR ART fig. 3 fig. 4

FIG. 5 fig. 6 fig. 7 under a force lower than a predetermined level. A spring (32) is installed between the tilt device (30) and the steering column (10) and functions to bias the tilt device (30) toward the steering column (10).

POSITION SETTING DEVICE FOR A STEERING COLUMN OF A VEHICLE

BACKGROUND OF THE INVENTION

1. Field of the Invention

The present invention relates to a position setting device for a steering column of a vehicle, particularly to a position setting device for the steering column of vehicle, wherein a telescoping device and a tilting device are controlled with one lever.

Generally, a steering column for a vehicle is installed within a cab so as to transmit rotary force which is generated from a steering handle, to a steering wheel.

And a telescopic device controlling the direction of axis and a tilt device controlling the direction of slant, are provided at this steering column so as to control the position of a steering handle according to the driver's physical condition.

2. Description of Background Art

Figure 1:
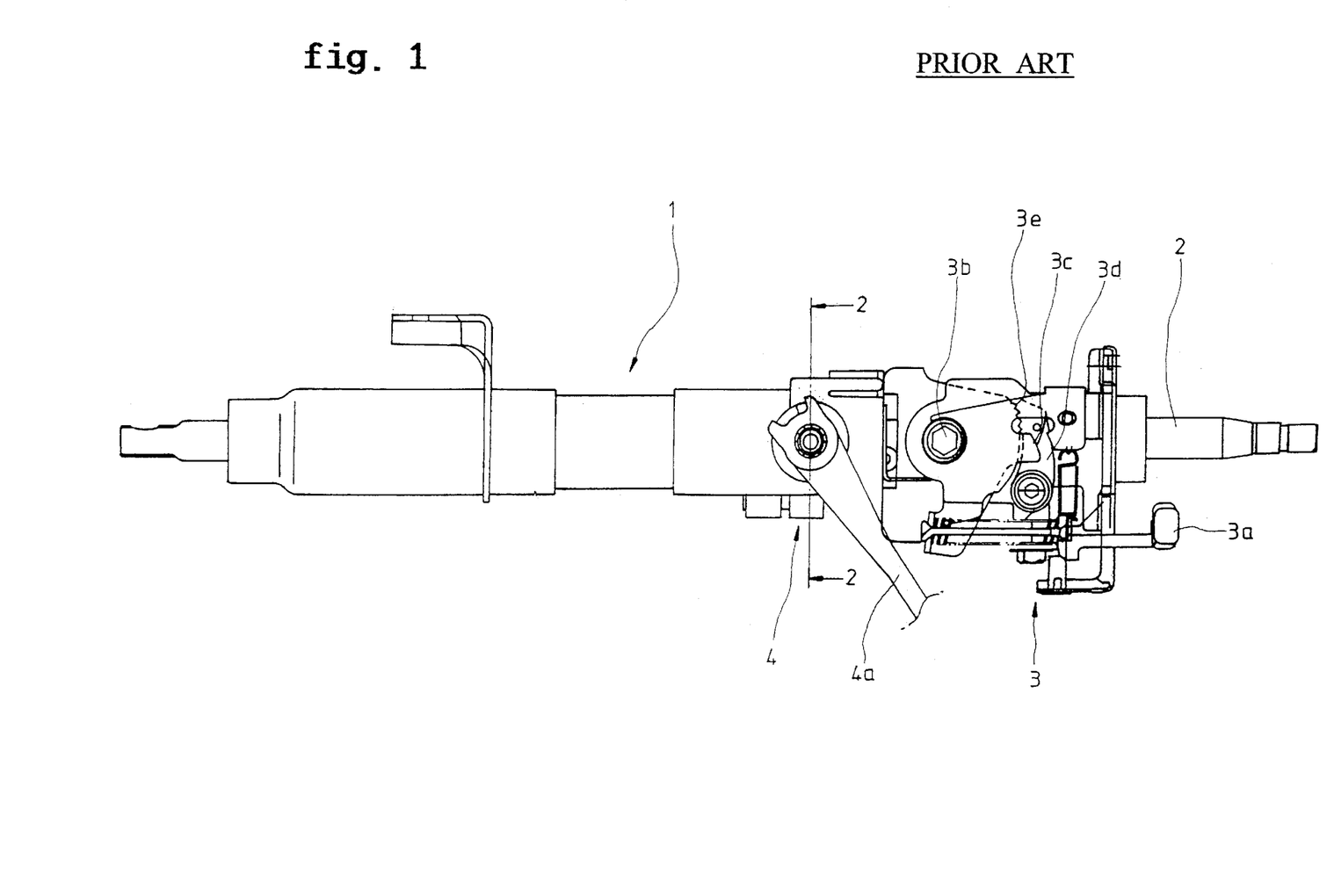
FIG. 1 is an elevational view showing a conventional steering column for vehicle.

FIG. 1 is a side cross-sectional drawing showing a conventional position setting device of steering columns for vehicle. As illustrated, within a steering column (1) which is contractible due to the provision of telescoping inner and outer tubes, a steering shaft (2a) incorporating a universal joint (not illustrated) in one side of a middle segment, is installed so as to move together with and be bent or angled pursuant to the contraction of the steering column (1).

Meanwhile, a tilt device (3) is provided in the one side of the steering column (1) so as to support the steering shaft (2a) wherein by the universal joint, the upper portion of the steering shaft (2) has an adjustable angle of inclination relative to the lower portion.

Figure 2:
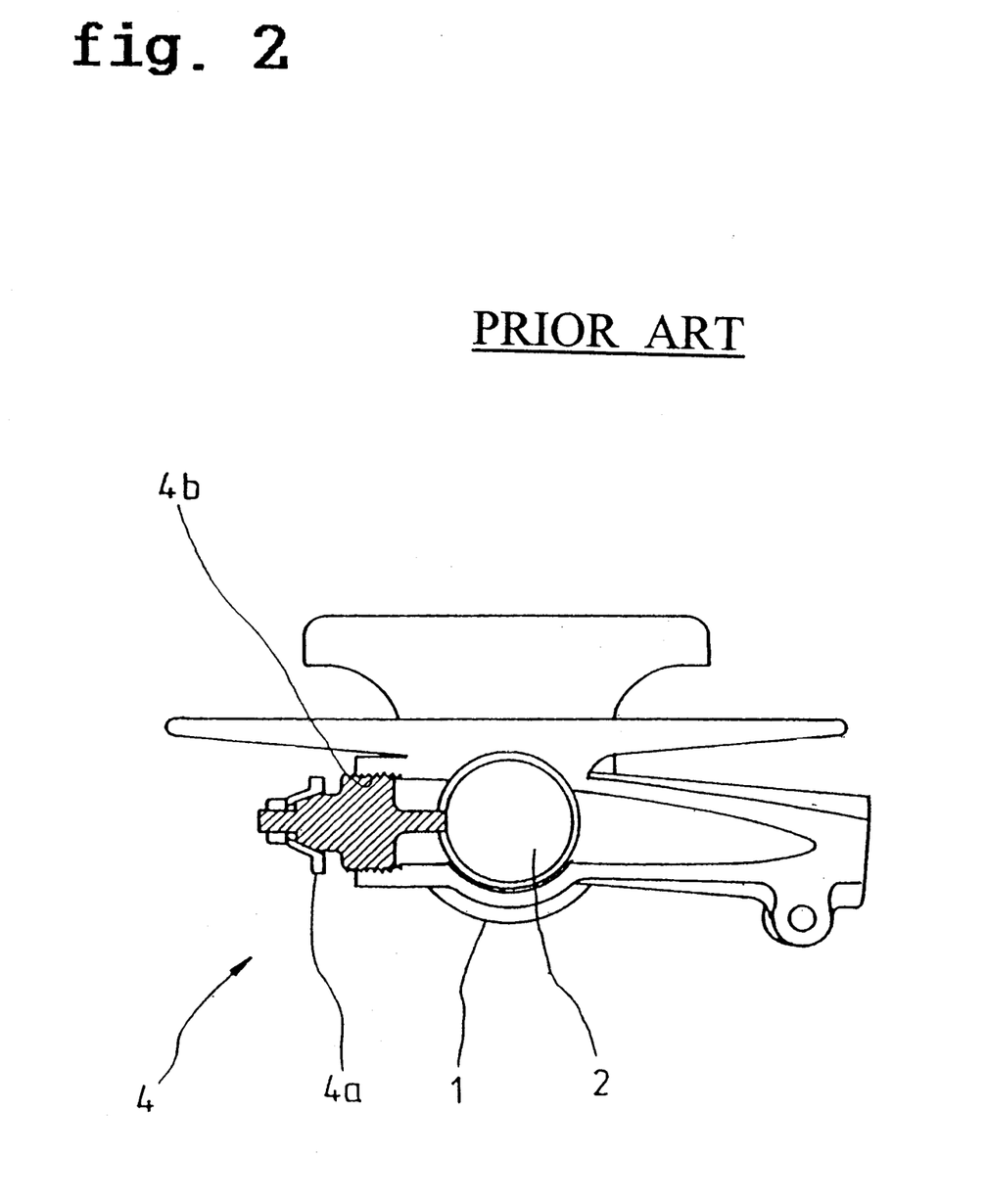
FIG. 2 is a cross-sectional view taken along the line 2—2 in FIG. 1.

This tilt device (3) is installed so as to pivot on a hinge (3b), the pull of a tilt lever (3a) leads a cam face (3c) which is installed on the same shaft as a hinge (3b), to open a rotation member (3d) and subsequently a tooth form (3e) becomes disengaged from an illustrated gear. As a result, the angle of inclination of the steering shaft (2a) is freely adjustable. FIG. 2 is a cross-sectional view showing the telescopic device. As illustrated, a telescopic device (4) is formed on the one-side face of the steering column (1).

And if a locking lever (4a) installed at the exterior of the steering column (1) is turned, a screw (4b) connected thereto is rotated. A fixation state with a steering shaft (2a) is thereby controlled.

By doing so, the steering column (1) will be moved axially when the screw (4b) is unscrewed and then is separated from the steering shaft (2).

In addition, if the screw (4b) is turned in the opposite direction, the steering shaft (2) becomes fixed within the steering column (1).

However, conventional position setting devices of steering columns for vehicles have the inconvenience that since separate levers for operating a tilt device and a telescopic assembly, are installed, to manufacture and install a steering column is complicated and it is hard to operate the tilt and the telescopic devices of such a steering column.

SUMMARY OF THE INVENTION

The present invention solves the above-described problems of conventional position setting devices of automotive steering columns. An object of the present invention is to provide a position setting assembly for steering column for a vehicle, which is easy to be manufactured and installed, and wherein a telescopic device and a tilt device may be controlled with a single lever.

Pursuant to the present invention, a position setting device for a steering column of a vehicle comprises a steering column having telescoping internal and external pipes for enabling alternate extension and contraction. A flexible or bendable steering shaft is disposed inside of the steering column, while a tilt device at one side of said steering column supports it according to a bend state of the steering shaft. A position control lever controls the tilt device by rotation. To that end, a wire cable including a wire, which is pulled by an amount determined by the degree of rotation of the steering shaft, is fixed on both sides of the bend in the steering shaft. The position setting device further comprises a tapered block which is moved by way of the wire and which is provided on a side with a guide protrusion. A lower block has a tapered guide groove for enabling movement of the lower block upwardly and downwardly by way of the guide protrusion which is inserted into the groove. A penetrate hole is provided through the external pipe to guide the up and down movement of the lower block. A support spring contacts the tapered block at one side in order to bias the lower block into a fixed engagement with the internal pipe.

DETAILED DESCRIPTION OF THE PREFERRED EMBODIMENT

Figure 3:
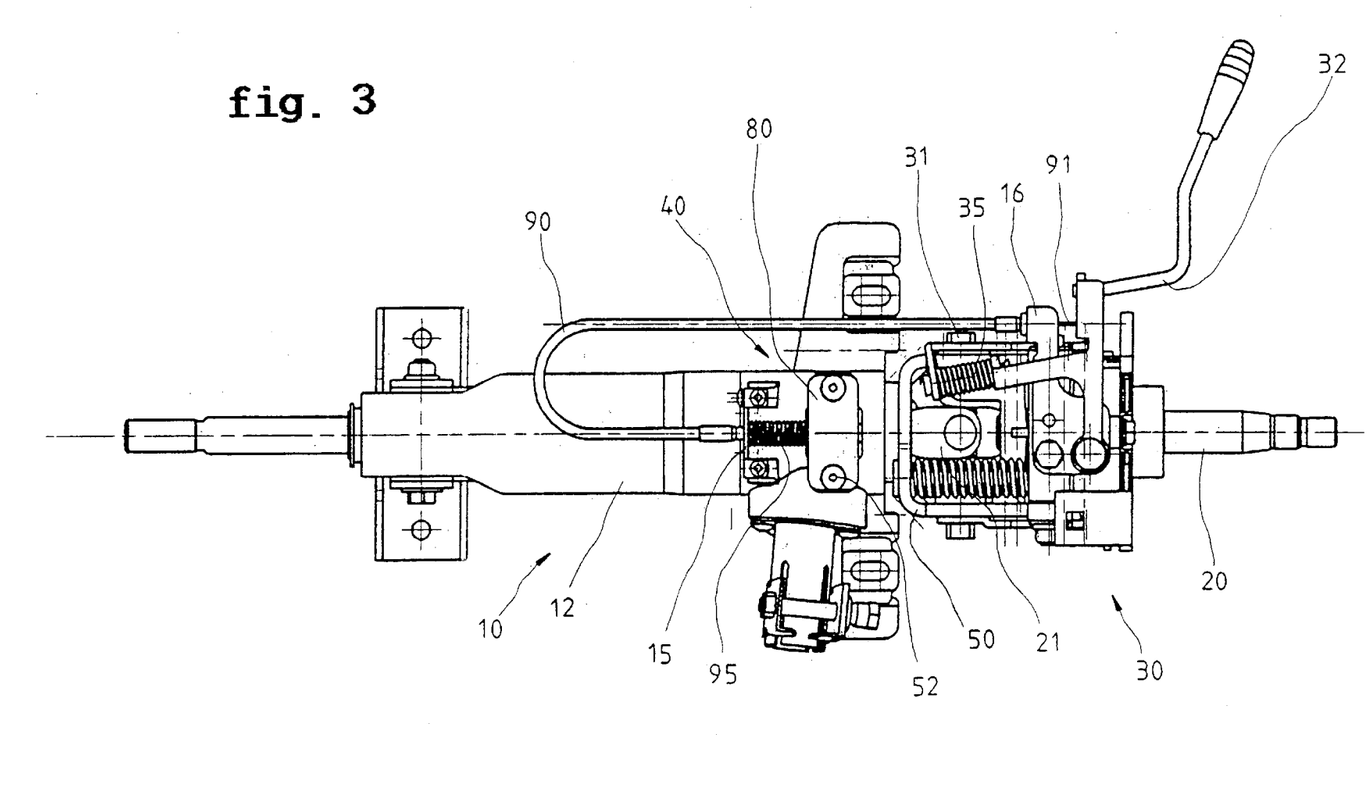
FIG. 3 is a plan view showing a position setting device for steering column of a vehicle, according to the present invention.

FIG. 3 is a plan view showing the position setting device for a steering column of a vehicle, according to the present invention. As illustrated, a steering column (10) is provided with a hollow pipe which is divided and formed of an internal pipe or tube 11 and an external pipe or tube 12, which telescopingly mate to allow alternating extension and contraction of the steering column (10).

Within the steering column (10), a steering shaft (20) is provided which has a universal joint (21) at an intermediate location so as to move with the steering column (10) and to bend at a desired angle.

Meanwhile, a tilt device (30) support the steering shaft (20) wherein an upper portion is bent at an optional angle with respect to a lower portion by means of a universal joint (21), is provided in the one side of the steering column (10).

This tilt device (30) pivots on a hinge (31) installed in the transverse direction with respect to the steering shaft (20).

In addition, within the inside of the hinge (31), a cam face (see 3c in FIG. 1) connected to the inside of the hinge (31)

and a rotation member (see 3d in FIG. 1) which is turned by the cam face, are provided.

And a tooth form portion (33, FIG. 1) is provided in the one side of the rotation member (3d, FIG. 1). This rotation member and the tooth form portion (3d) are connected to the cam face (3c), thereby being attachable and detachable by way of a position control lever (32) extending to the exterior.

In this context, the provision of a restoring spring (35) connected to a mounting bracket (50) in the one direction of the position control lever (32) allows the position control lever (32) to be returned to its original position, after it is operated.

In addition, the present invention provides a telescoping-action control device (40) (hereinafter "the telescopic control device") in the external upper portion of the steering column (10), which moves together with the tilt device (30) when the tilt device is operated by the rotation of the position control lever (32).

Figure 4:
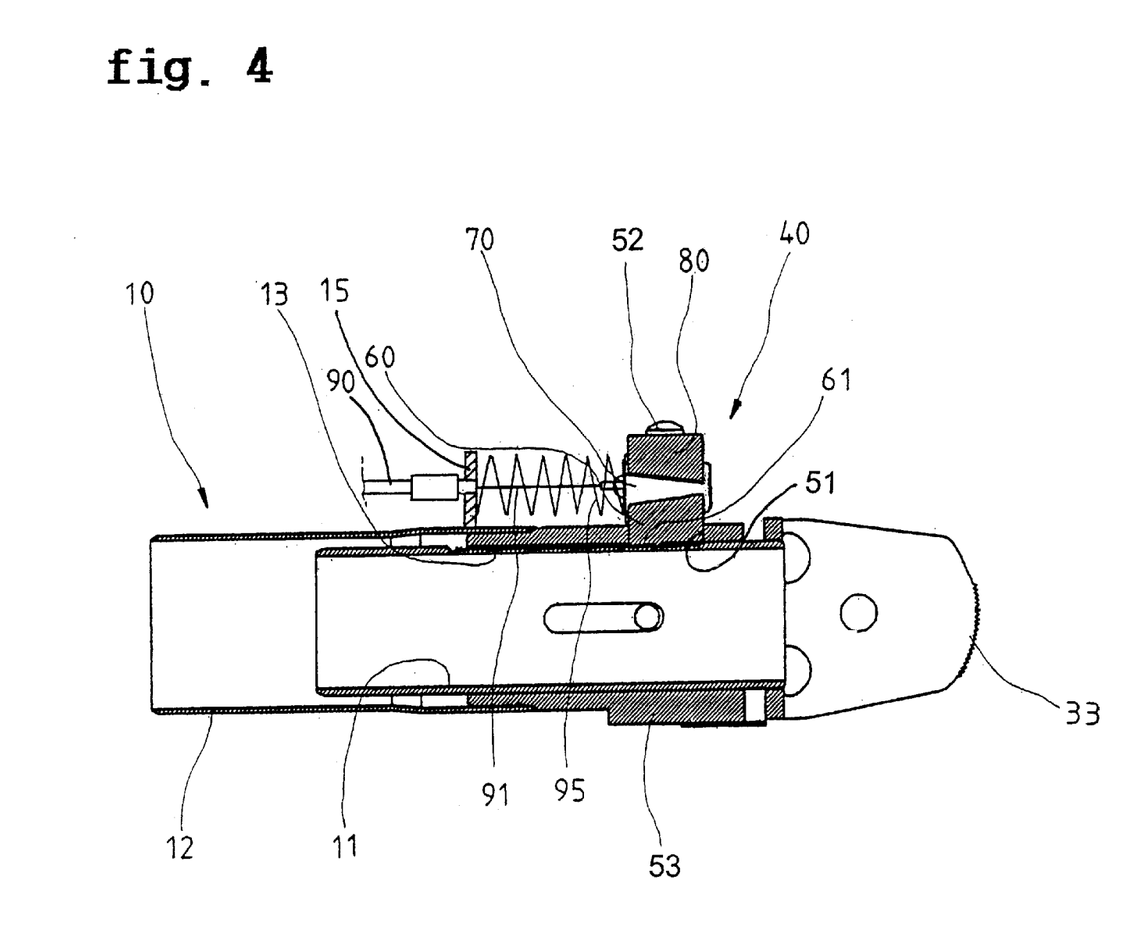
FIG. 4 is a side cross-sectional view showing a position setting device of the steering column according to the present invention.

As illustrated in FIG. 4, a telescopic control device (40) is installed in a manner that it can be alternately attached to and detached from the internal pipe (11) of the steering column (10) by penetrating a hole (51) in a hollow core member (53) connected to the external pipe (12) of the steering column (10).

That is to say, the telescopic control device (40) maintains the fixation state of the steering column (10), when the telescopic control device is connected to the internal pipe (11), and when the telescopic control device (40) is separated from the internal pipe (11), the steering column (10) can extend and contract in the manner of a telescope.

For this, the quadrangular penetrate hole (51) is provided in the hollow core member (53) and a tooth form (13) enabling an adherent force, is provided on an external surface (not separately labeled) of the internal pipe (11) along the lower side of this penetrate hole (51).

And at an upper portion of the tooth form (13), a lower block (60) of the telescopic control device (40) is provided with a tooth form (61) in a lower face.

Figure 5:
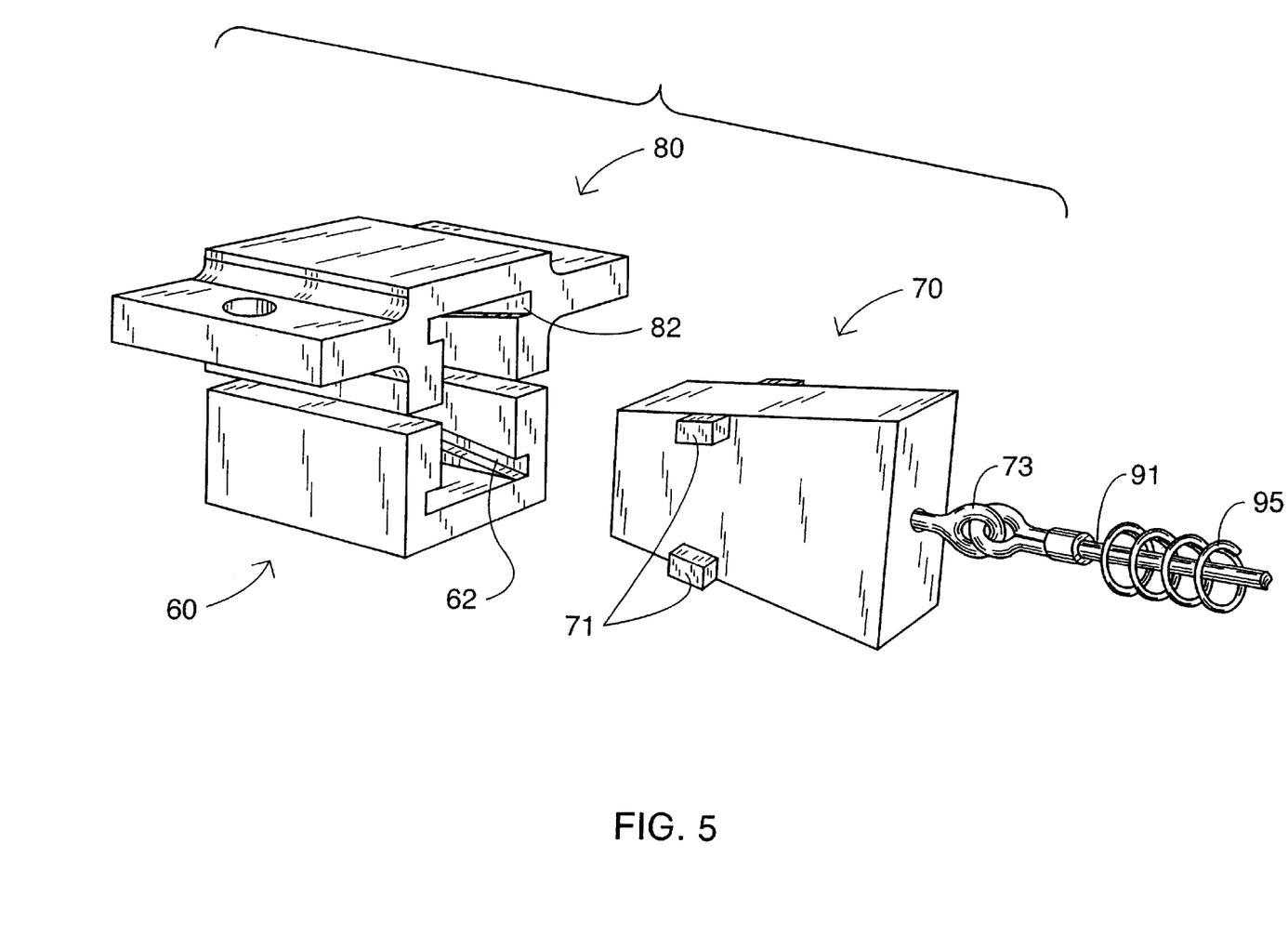
FIG. 5 is fragmentary perspective view showing the position setting device according to the present invention.
Figure 6:
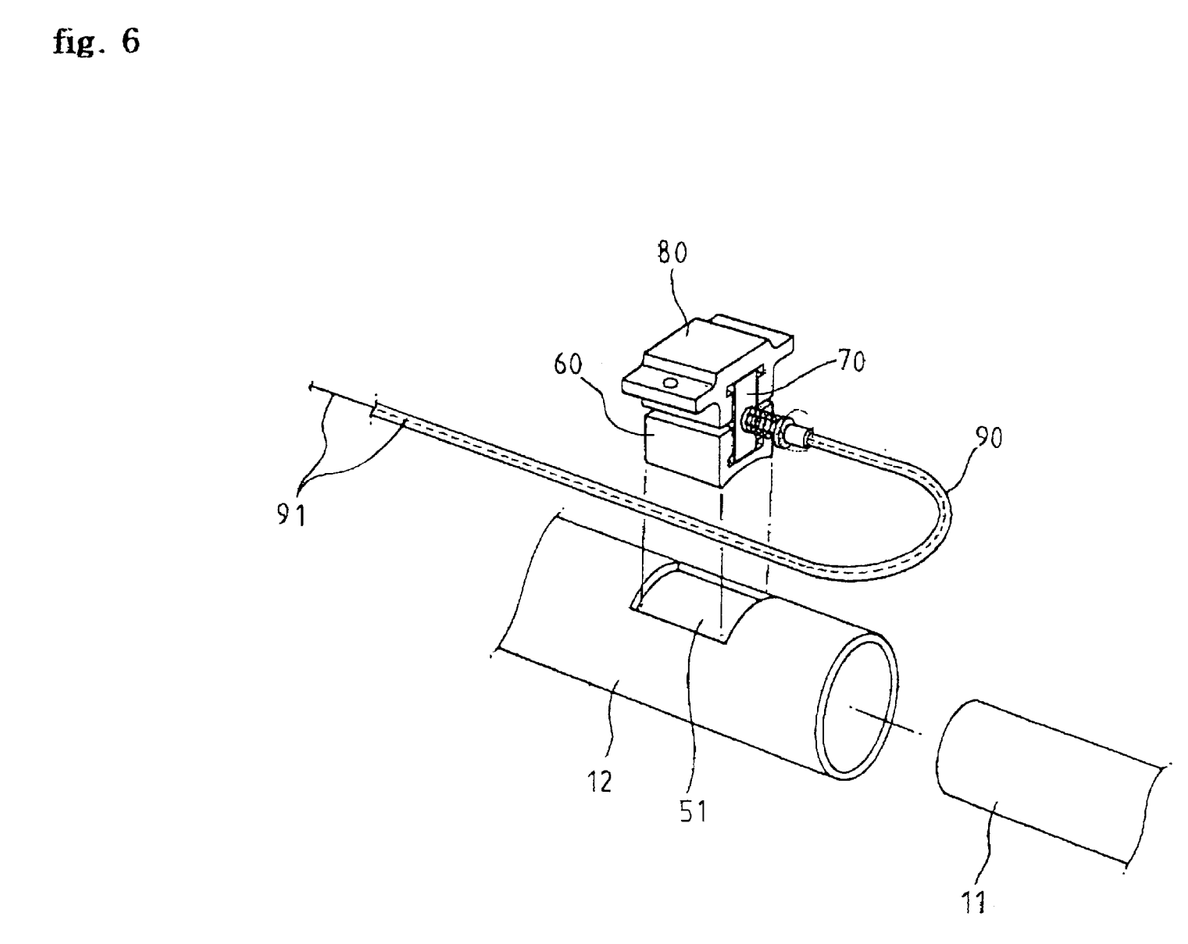
FIG. 6 is a partial exploded perspective view of a modified position setting device similar the that of FIG. 4.
Figure 7:
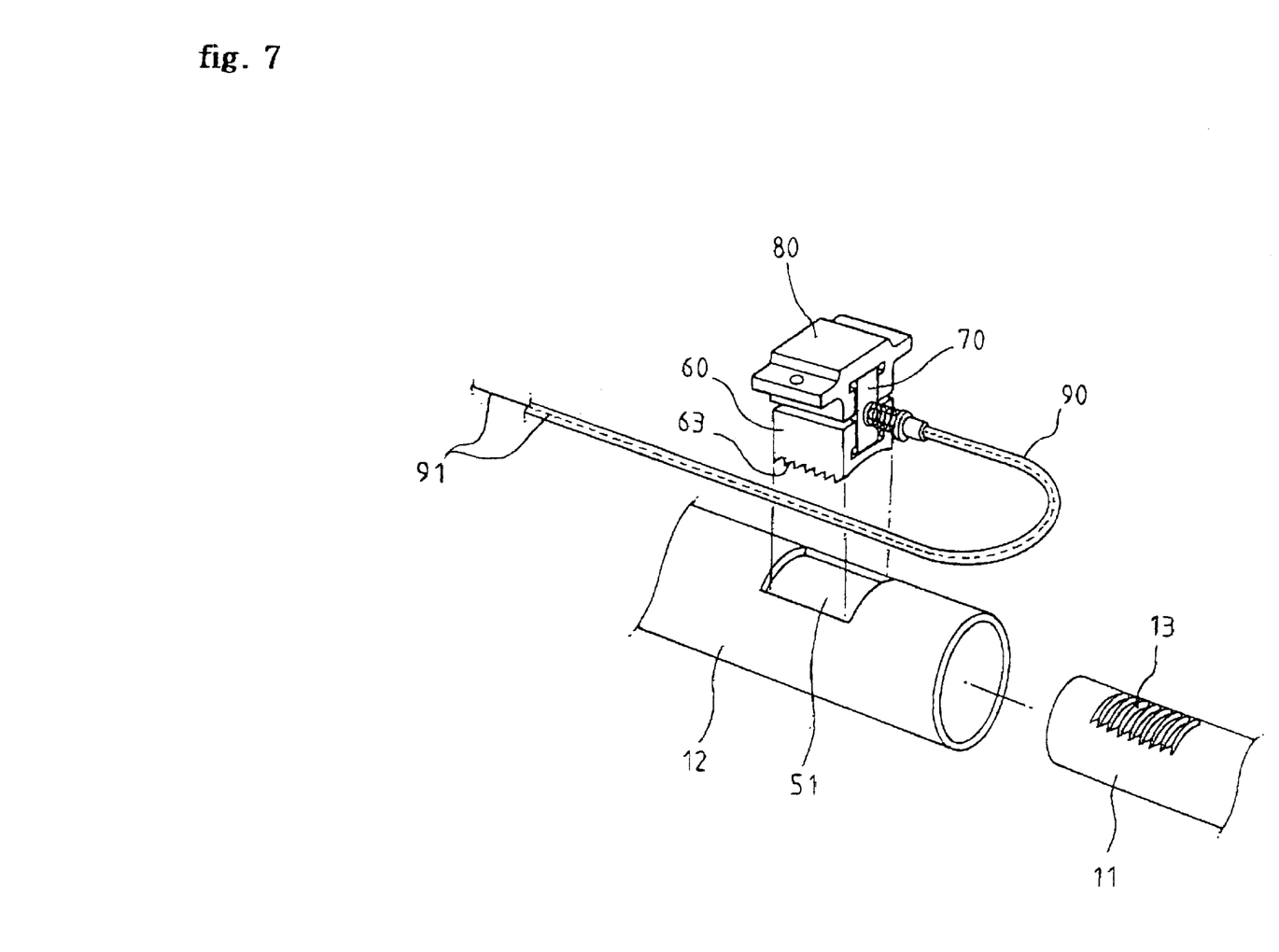
FIG. 7 is a partial exploded perspective view of the position setting device of FIG. 4.

As illustrated in FIG. 5, guide grooves (62) are provided internally to the lower block (60) and taper towards one another at both sides of the inside of this lower block (60).

And at the upper side of the lower block (60), the telescopic control device (40) includes an upper block (80) having guide grooves (82) which taper towards one another at both sides of the upper block (80) and which are opposed to the grooves (62) in the lower block (60).

In this context, the guide grooves (62, 82) of the lower block (60) and the upper block (80) are arranged opposite to each other, to generate a space between the guide grooves (62, 82) which on one side of the blocks (60, 80) is narrow and on other side is wide.

In addition, guide protrusions (71) are formed both at the upper and lower sides of a tapered block (70) and are inserted into the upper and lower guide grooves (82, 62) so as to move along the guide grooves (82, 62) at the interior of the upper and lower blocks (80, 60). The tapered block (70) has upper and lower side faces which are formed taperingly and is movably inserted into a space defined by the upper and lower blocks (80, 60).

The upper block (80) and the lower block (60) are moved relative to one another by movement of the tapered block (70), so that the distance between the blocks (80, 60) becomes large or small by virtue of the upper and lower side faces of the tapered block (70) and the guide protrusions (71).

In this context, the tapered block (70) has a wedge shape corresponding to the distances between the guide grooves (62, 82) narrow on one side and wide on the other side.

Also, in order for the lower block (60) to be moved upwardly and downwardly through the penetrate hole (51) by setting the position of the upper block (80), a connection portion (52) is provided which protrudes upwardly and which supports the upper block (80).

At the same time, a wire cable (90) is installed between the position control lever (32) on one side and the tapered block (70) on the other side so as to actuate the telescopic control device (40).

This wire cable (90) houses a wire (91) and its one end is connected to a forward fixation portion (15) which is provided at the forward side of the connection portion (52) and its other end is connected to and installed at a rearward fixation portion (16) which is provided at the forward side of the position control lever (32). Therefore, in its entirety, the wire cable is arranged as a big u-shape.

The wire (91) inside the wire cable (90) is operated within the wire cable (90) has one end connected to one end of the position control lever (32) and another end connected to an eyelet or hook (73) at the narrow side of the tapered block (70).

In addition, a supporting spring (95) is provided at the tapered block (70). The tapered block (70) is pulled forward by the wire (91) when the position control lever (32) is rotated, as the spring (95) serves to return the tapered block (70) to the original position after actuation of the position control lever (32) is terminated.

The supporting spring (95) is installed between the wide side of the tapered block (70) and the forward fixation portion (15) in such a manner that the wire (91) may pass through the interior of the spring.

Since under the action of the supporting spring (95), the tapered block (70) is moved backward, the upper block (80) and the lower block (60) are normally separated from each other. The lower portion (60) which is supported by the upper portion (80) fixed by the connection portion (52), is connected with the internal pipe (11) located below the lower portion.

A position setting device for a steering column of vehicle as described above, maintains the position of a controlled steering column (10) since when the position control lever (32) is not operated, the tooth form portion (3e) of the tilt device (30) engages with the rotation member and the tooth form (61) of the lower block (60) downwardly biased by the action of the supporting spring (95) engages with the tooth form (13) of the internal pipe (11).

In this context, a pulling of the position control lever (32) allows the tooth form portion (3e) and the rotation member of the tilt device (30) to be separated, and therefore, to control the angle of the steering column (10).

And the wire (91) is pulled by the position control lever (32) and moves the tapered block (70) forward.

Subsequently, a space between the upper block (80) and the lower block (60) becomes close according as the guide protrusion (71) is moved along guide grooves (62, 82). Eventually, the lower block (60) is moved upward.

That is, a space between the lower block (60) and the internal pipe (11) is opened, thereby enabling axial adjustment of the length of the steering column (10).

After the tilt control device (30) and telescopic control device (40) of the steering column (10) are operated and the position control lever (32) is actuated, the position control lever (32) is returned to the original position by the restoring spring (35). Subsequently, the tooth form portion (3e) engages with the rotation member in the tilt device (30) and the lower block (60) and the internal pipe (11) are meshed with each other under the action of the telescopic control device (40). Such a state is then maintained.

As described, a position setting device for a steering column of a vehicle according to the present invention has the advantage that the tilt device and the telescopic control device are controlled with one lever, and as a consequence, it is easy to manufacture, install and manipulate the steering column.

What is claimed is:

1. In a vehicle steering column having telescoping inner and outer tubes, a bendable steering shaft with a joint inside said tubes, and a tilting device at one side of said tubes, a position setting device for the steering column, comprising:

a position control lever controlling by rotation the operation of said tilting device;

a wire cable having a movable wire operatively connected at one end to said position control lever, said wire cable being connected at one end to a rear fixation portion and at an opposite end to a forward fixation portion;

a tapered block movable in an axial direction, another end of said wire being connected to said tapered block for moving same, said tapered block being provided with a plurality of guide protrusions;

a first block fixed relative to the outer tube, said first block being formed with at least one first guide groove receiving a respective one of said guide protrusions;

a second block movable in a substantially transverse direction relative to said inner and outer tubes, said second block being provided with at least one second guide groove receiving a respective one of said guide protrusions, said second guide groove and said first guide groove being spaced a tapering distance from one another, said outer tube being provided with a hole traversable by said second block; and a biasing spring in operative engagement with said tapered block for biasing said tapered block in a direction to place said second block into a releasable locking engagement with said inner tube.

2. The position setting device of claim 1 wherein a first tooth form is provided along an outer surface of said inner tube and wherein a second tooth form is provided along one side of said second block, said first tooth form and said second tooth being engaged with one another in said locking engagement.

* * * * *